United States Patent
Gee et al.

(10) Patent No.: US 6,234,335 B1
(45) Date of Patent: *May 22, 2001

(54) SEALABLE CONTAINER AND OPEN TOP CAP WITH DIRECTLY BONDED ELASTOMER SEPTUM

(75) Inventors: Alan R. Gee, Greenwich; William R. Delaney, Clifton Park; Paul M. Petrosino, Schoharie, all of NY (US)

(73) Assignee: Integrated Liner Technologies Inc., Albany, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/811,240

(22) Filed: Mar. 3, 1997

Related U.S. Application Data

(62) Division of application No. 08/349,270, filed on Dec. 5, 1994, now Pat. No. 5,647,939.

(51) Int. Cl.[7] .................................................... B65D 41/20
(52) U.S. Cl. .................................. 215/247; 215/DIG. 3; 215/349; 604/415; 604/905; 156/272.6
(58) Field of Search ................................... 215/247, 249, 215/350, 349, 346, 341, 320, 324, 232, 274, DIG. 3; 220/359, 359.1; 604/411, 415, 905; 156/272.6, 273.2

(56) References Cited

U.S. PATENT DOCUMENTS

| | | | |
|---|---|---|---|
| 1,213,959 | * | 1/1917 | Segall .................................... 215/324 |
| 2,072,536 | * | 3/1937 | Trickey et al. ....................... 215/349 |
| 3,862,880 | | 1/1975 | Feldman . |
| 3,928,109 | * | 12/1975 | Pollock et al. .................... 215/349 X |
| 4,035,216 | * | 7/1977 | Immel . |

(List continued on next page.)

FOREIGN PATENT DOCUMENTS

| | | |
|---|---|---|
| 37 37 073 | 5/1989 | (DE) . |
| 386642 | 9/1990 | (EP) . |
| 0 479 592 | 4/1992 | (EP) . |
| 55-003094 | * 1/1980 | (JP) . |
| 57-169348 | 10/1982 | (JP) . |
| 58-98234 | 6/1983 | (JP) . |
| 61-002738A | 1/1986 | (JP) . |
| 62-179536A | 8/1987 | (JP) . |
| 63-196631 | 8/1988 | (JP) . |
| 63-248657 | 10/1988 | (JP) . |
| 63-304078 | 12/1988 | (JP) . |
| 64-80099 | 3/1989 | (JP) . |

(List continued on next page.)

OTHER PUBLICATIONS

Database WPI, Section Ch, Week 9317, Derwent Publications Ltd., London, GB; AN 93–140080, XP002078041 & JP 05 077380 A (Toyoda Gosei KK), Mar. 30, 1993, Abstract.

Database WPI, Section Ch, Week 8329, Derwent Publications Ltd., London, GB; AN 83–714170, XP002078023 & JP 58 098234 A (Bridgestone Tire KK), Jun. 11, 1983, Abstract.

*Primary Examiner*—Allan W Shoap
*Assistant Examiner*—Robin Hylton
(74) *Attorney, Agent, or Firm*—Heslin & Rothenberg, P.C.

(57) ABSTRACT

A sealing element for sealing a container includes a cap having a top with an opening therein in combination with a septum. The septum includes an elastomer in direct physical contact with an interior surface of the cap. The septum occludes the opening in the top. There is no layer of adhesive or plastic material between the elastomer and the interior surface of the cap. The cap may be made of plastic or metal. Also provided is a method of directly bonding an elastomer, such as silicone rubber, to a plastic or metal.

21 Claims, 2 Drawing Sheets

U.S. PATENT DOCUMENTS

| | | | |
|---|---|---|---|
| 4,211,825 | * | 7/1980 | Shipman . |
| 4,223,074 | | 9/1980 | Yoshida et al. . |
| 4,269,321 | * | 5/1981 | Ichinose et al. ................. 215/341 X |
| 4,312,349 | * | 1/1982 | Cohen ............................... 604/415 X |
| 4,312,824 | * | 1/1982 | Mori et al. ........................ 264/268 X |
| 4,343,754 | * | 8/1982 | Wilde et al. ..................... 264/268 X |
| 4,378,893 | * | 4/1983 | Wilde et al. ..................... 215/350 X |
| 4,429,803 | | 2/1984 | Butterfield . |
| 4,441,621 | | 4/1984 | Matukura et al. . |
| 4,499,148 | | 2/1985 | Goodale . |
| 4,635,807 | * | 1/1987 | Knapp .................................. 215/247 |
| 4,765,860 | | 8/1988 | Ueno et al. . |
| 4,773,552 | * | 9/1988 | Boege et al. ..................... 215/350 X |
| 4,898,638 | | 2/1990 | Lugez . |
| 4,938,827 | | 7/1990 | Leach et al. . |
| 5,061,263 | | 10/1991 | Yamazaki et al. . |
| 5,088,612 | * | 2/1992 | Storar et al. ......................... 215/247 |
| 5,165,560 | * | 11/1992 | Ennis, III et al. ................... 215/247 |
| 5,180,599 | * | 1/1993 | Feldmeier et al. ............ 220/269.1 X |
| 5,182,141 | | 1/1993 | Borys et al. . |
| 5,289,932 | * | 3/1994 | Dimeo et al. .................... 215/341 X |
| 5,290,424 | | 3/1994 | Mozelewski et al. . |
| 5,303,835 | | 4/1994 | Haber et al. . |
| 5,316,739 | | 5/1994 | Yoshikawa et al. . |
| 5,520,764 | * | 5/1996 | Toney et al. .................. 156/272.6 X |
| 5,579,936 | * | 12/1996 | Costa et al. ........................... 215/261 |
| 5,662,230 | * | 9/1997 | Finneran .............................. 215/252 |
| 5,695,083 | * | 12/1997 | Obadia ............................ 215/320 X |

FOREIGN PATENT DOCUMENTS

| | | |
|---|---|---|
| 2-41233 | 2/1990 | (JP) . |
| 4-145139 | 5/1992 | (JP) . |
| 05132569A | 5/1993 | (JP) . |
| 5-202208 | 8/1993 | (JP) . |
| 06163143A | 6/1994 | (JP) . |

* cited by examiner

US 6,234,335 B1

SEALABLE CONTAINER AND OPEN TOP CAP WITH DIRECTLY BONDED ELASTOMER SEPTUM

This application is a division of application Ser. No. 08/349,270 filed Dec. 5, 1994 which application is now U.S. Pat. No. 5,647,939.

TECHNICAL FIELD

The present invention relates to bonding of a cured elastomer to a plastic or metal. More particularly, the present invention relates to a method of bonding cured silicone rubber to a plastic and plastic caps made by such a method.

BACKGROUND OF THE INVENTION

It is well known that silicone rubber is generally inert and is, therefore, particularly well suited for use in medical and scientific fields. For example, silicone rubber is often employed as part of a closure for bottles or containers intended to receive medical or scientific samples. Particularly useful in medical and scientific field is a container utilizing an open top cap, which is a cap with an aperture therein which is in turn sealed by a septum. Sealing the cap's aperture prevents contamination or loss of the sample yet allows a needle to be inserted through the septum of the cap and into the container in order to insert or withdraw the sample. Due to the generally inert nature of silicone rubber and its resealing properties it would be preferred that the septum be comprised, at least in part, of silicone rubber.

The EPA has published standards under 40 C.F.R. §136 "Guidelines for Establishing Test Procedures for the Analysis of Pollutants" and 40 C.F.R. §141 "National Interim Primary Drinking Water Regulations: Control of Trihalomethanes in Drinking Water" which relate to acceptable testing procedures. These EPA standards specify a vial/cap/septum combination as well as detailed cleaning and sampling procedures which are designed to ensure that the sample is not contaminated or lost prior to analysis. These EPA regulations specify an open top cap and a septum comprised of silicone rubber laminated with polytetrafluoroethylene (Teflon), such that the face of the Teflon lamination is exposed to the sample.

Although use of a united cap and liner meeting the EPA specifications would be preferred, the industry has to date largely dealt with these requirements by using a separate septum unattached to the cap. Unfortunately, existing methods of attaching a silicone rubber septum to an open top cap are ill-suited for uses related to sampling of scientific or medical samples.

The conventional method of attaching a liner or septum onto a cap utilizes some type of adhesive, which may come in contact with, and potentially contaminate, the sample. In this regard it should be noted that even minor contamination may make critical analytical analysis of pollutants difficult or untrustworthy, since tests are commonly directed towards the presence of pollutants at the level of ppm (part per million) or even ppb (part per billion). Moreover, the EPA specification of a silicone rubber/Teflon septum presents further problems since many adhesives simply do not work well with silicone rubber. In addition, of those adhesives compatible with silicone rubber, many are thermoplastic adhesives which will not withstand common cleaning methods, such as those specified by the EPA cleaning standards.

Other attempts to solve this problem have included curing of the silicone elastomer and a primer directly upon the surface of a polyolefin sheet. For example, in U.S. Pat. No. 4,499,148 issued to Goodale et al. a thin film of polyolefin is corona discharge treated whereupon the uncured silicone is placed together with a primer therebetween. Pressure is then applied to force the materials together and then heat is applied in order to cure the silicone elastomer, thereby bonding the silicone elastomer to the polyolefin sheet as part of the curing process. Thereafter, circular sections of the polyolefin/silicone elastomer laminate are formed and inserted within a polyolefin cap having an aperture in the top. The polyolefin layer of the polyolefin/silicone elastomer laminate is then welded to the interior of the polyolefin cap by ultrasonic welding.

However, this process taught in Goodale '148, as well as the resulting cap, suffers significant drawbacks. Often open top caps leave only a narrow flange, commonly about 3.8 mm or less, on the inside of the cap. Directing the welding energy onto such a narrow surface makes it difficult to consistently obtain a strong bond between the two polyolefin surfaces. Another drawback arises from the use of a polyolefin/silicone elastomer laminate, as opposed to a silicone elastomer alone. The inelasticity of the polyolefin layer makes penetration with a needle difficult and often causes the needle to bend or break, thereby creating significant health and safety concerns and interfering with the use of automatic sampling equipment. However, simply using a thinner polypropylene film in order to decrease the difficulty experienced with inserting the needle causes an increase in welding problems and is not a viable alternative.

Therefore, there exists a need for a cap having an inert elastomer bonded directly to the interior of the cap without the use of adhesives or thin layers of plastic. There further exists a need for such a cap which is capable of withstanding the cleaning procedures required by standard scientific and medical sampling techniques. There likewise exists a need for a cap which will prevent pockets of trapped fluid or air from forming during sampling and cleaning procedures. Moreover, there exists a need for a cap which when utilized to hold medical or scientific samples will not contaminate such samples, allow leakage of such samples or allow the formation of air bubbles within the container. In addition, there exists a need for a method for forming a durable and water resistant bond between inert elastomers, such as silicone rubber, and other materials commonly used in caps and vials. Furthermore, there Likewise exists a need for a method for making a durable cap with a septum bonded thereto having the characteristics discussed above.

DESCRIPTION OF THE INVENTION

Figure 1:
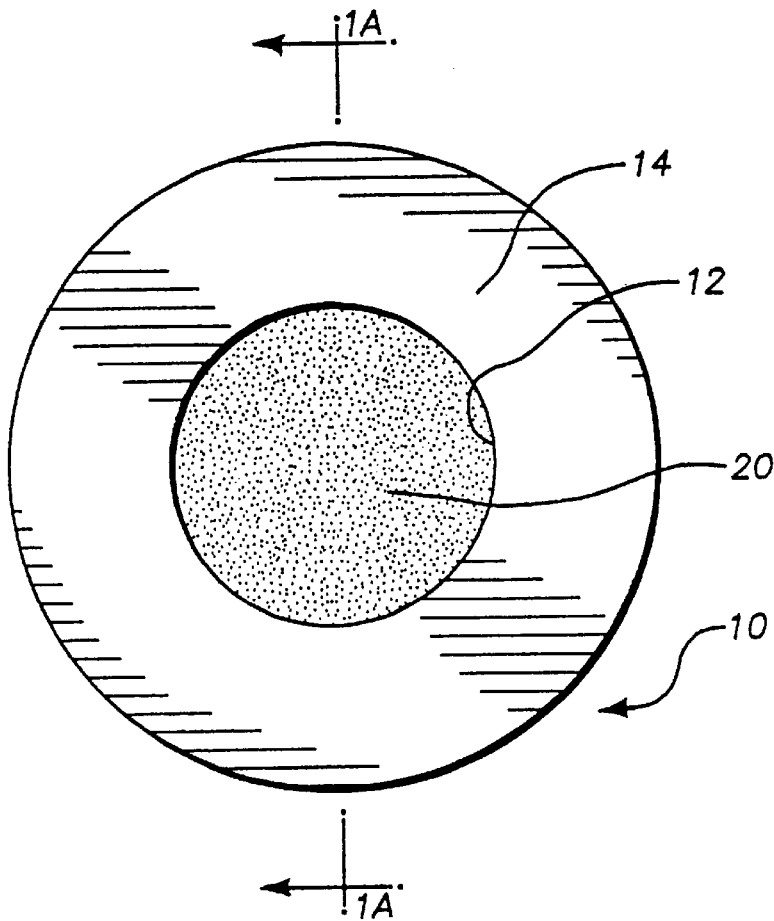
FIG. 1 is a top view of a screw cap having an open top and septum.

The present invention encompasses a method of bonding an elastomer to a plastic or metal comprising ionizing a surface upon the elastomer thereby forming a first activated area; ionizing a surface upon the plastic thereby forming a second activated area; placing the first and second activated areas in contact with one another and applying pressure thereto thereby forming a direct bond between the elastomer and the plastic. The present invention also encompasses a sealing element comprising a plastic cap having a top with an opening therein; a septum comprising an elastomer in direct physical contact with an interior surface of said flange top thereby occluding the opening within the top and whereby there is no layer of adhesive or plastic material between the elastomer and the top.

The plastic may be treated with a flame, corona or plasma discharge as well as by radiation or high intensity UV light. This treatment ionizes the surface of the material intended to be bonded with the rubber. As used throughout, the term plastic refers to both thermosetting and thermoplastic materials, examples being phenolics and polyolefines. Preferably, the surface area of the plastic intended to be bonded with the elastomer is ionized by exposure to a corona electrode having approximately 0.3 to 0.7 milliamps of current passing therethrough at a distance of approximately 2.5 cm or less from the plastic's surface, for less than a second.

The elastomer may be shaped to the desired form, although preferably the surface to be bonded is substantially flat such that it will lie flush upon the plastic. Examples of elastomers include, but are not limited to, silicone rubber, SBR rubber, butyl rubber and viton rubber. The surface of the elastomer intended to be bonded with the plastic may similarly be ionized by treating the surface of the rubber with flame, corona or plasma discharge as well as by ionizing radiation or with high intensity UV light. When utilizing a corona discharge electrode at 0.3 to 0.4 milliamps current, the preferred treatment takes less than a second with the electrode approximately 2.5 cm from the surface of the elastomer. Preferably the electrode is placed from about 6 mm to about 38 mm from the surface to be treated.

As soon as possible after the corona treatment of the elastomer surface, the activated area of the elastomer may be placed in contact with the activated surface of the plastic. Pressure in the amount of approximately 3.5 kg/cm$^2$ may be applied at the areas in contact for 1 to 2 minutes thereby achieving a bond between the two materials.

Optional surface treatments may be applied to the plastic after ionization of the surface, and before contact, in order to enhance the resulting bond. Examples of such surface treatments or primers include silane coupling agents and reactive silanes. The use of these materials to modify adhesive bonding is discussed in "Silane Coupling Agents" by E. P. Plueddemann, Q.D.412 S6P5 1982 ISBN 0-306-40957-7. However, this work covers the use of such agents in bonding of inorganic materials, such as glass fibers, in a matrix of thermoset or uncured resin. A preferred primer includes approximately ¼–2% isopropanol solution of an aminosilane of formula:

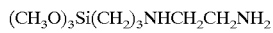

(CH$_3$O)$_3$Si(CH$_2$)$_3$NHCH$_2$CH$_2$NH$_2$ or

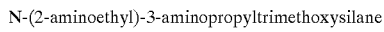

N-(2-aminoethyl)-3-aminopropyltrimethoxysilane

It is believed that the primer enhances the bond strength and increases the time allowed for bonding after ionization of the surface. Utilization of the primer is preferred when more than 1 hour will elapse between ionization of the plastic and contact with the activated surface of the elastomer. It is believed that the silane occupies the reactive sites on the surface of the plastic and provides a more stable reactive species for later reaction with the surface of the activated elastomer.

Similarly, it is also an option to apply heat at about 120° C. while pressure is applied to the activated surface of the elastomer and the activated surface of the plastic or other material. Application of heat is not necessary when the activated elastomer and activated plastic material are brought into pressurized contact immediately after treatment. However, application of heat during the pressurized contact is preferred, particularly when a significant delay is experienced between ionization and pressurized contact.

In addition, the method described above may be utilized to bond elastomers to other materials, examples being metals, such as aluminum. However, when bonding the elastomers to materials such as metals it is unnecessary to treat the metal surface to form an activated area. After treatment of the elastomer, the active area of the elastomer may be bonded directly to a metal surface previously wetted with a primer such as a silane coupling agent.

As used throughout, the term cap refers to a device capable of encapsulating or sealing an opening of a container. The caps may form a seal with the containers by means well known in the art, examples include screw caps/threaded caps, snap-on caps, crimp caps, as well as other means known in the art for attaching a cap to a container.

EXAMPLE 1

Figure 1A:
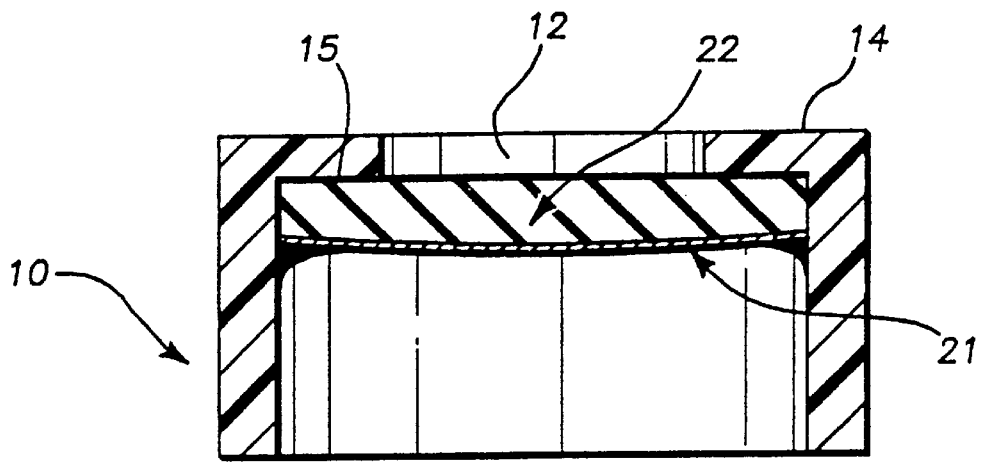
FIG. 1a is a cross-sectional side view of the screw cap of FIG. 1 taken at A–A$^1$.

A 24 mm 24–400 polypropylene cap 10 (as seen in reference to FIGS. 1 and 1a) having a 14 mm hole 12 in the top 14 (having a 3.8 mm inch interior surface 15 on the inside portion of the cap) is provide. A thin layer of Teflon 21 is bonded to a sheet of silicone rubber 22 by standard means, such as pressing and curing the rubber upon an etched and primed Teflon film. Sections of the silicone rubber/Teflon laminate are cut in order to form a septum 20, which is sized to tightly fit within the interior of the cap 10, having a diameter of approximately 22 mm. The interior portion 15 of the top 14 of the cap is treated by corona discharge treatment by an electrode having approximately 0.3 to 0.7 milliamps at a distance of approximately 2.5 cm from the electrode for approximately ¾ of a second. A 1% solution of aminosilane of formula N-(2-aminoethyl)-3-aminopropyltrimethoxysilane in isopropanol is applied to the inner surface 15 and air dried. The septum 20 is then treated on the surface of the silicone rubber 22 by corona discharge treatment employing a corona electrode, having 0.3 to 0.4 milliamps of current, 2.5 cm from the surface for approximately ¾ second. The treated septum 20 is then immediately inserted into the cap 10 and approximately 3.5 kg/cm$^2$ (about 50 psi) is applied to the septum 20 from its opposite face (the side having the Teflon layer 20) and heated to about 120° C. The pressure is removed and the cap 10 is allowed to cool to room temperature whereupon the septum 20 is bonded directly to the interior surface 15 of the polypropylene open top cap 10, which fully occludes the aperture 12 of the cap 10 and creates a durable liquid tight seal.

EXAMPLE 2

Figure 2:
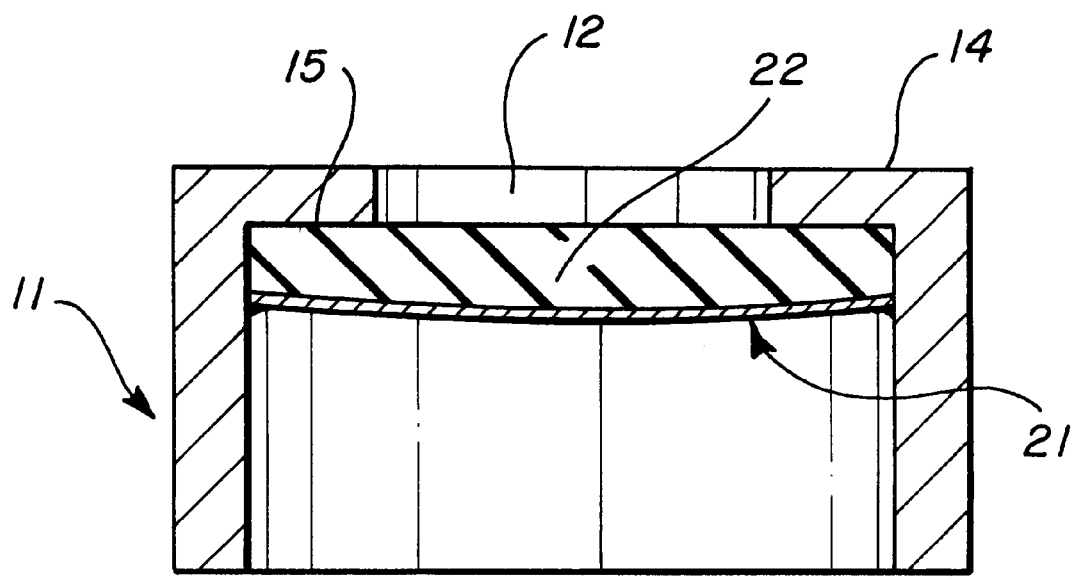
FIG. 2 is a cross-sectional side view, similar to FIG. 1a, of a metal cap embodiment of the present invention.

Wetting the interior surface of an aluminum crimp cap 11 (see FIG. 2), such as used on analytical vials and injectable drugs and which has a hole in the top, with 1% silane coupling agent and allowing the same to air dry. A natural rubber/F.E.P. laminate, which may be sized to comprise a septum, may be treated on the natural rubber surface with corona discharge treatment by an electrode having 0.3 to 0.7 milliamps at a distance of about 1 inch for approximately ¾ of a second. The activated area of the elastomer and the aluminum are pressed together under 3.5 kg/cm$^2$ and at a temperature of about 120° C. to form a bond therebetween.

EXAMPLE 3

The interior surface of the top of a phenolic thermoset open top cap, such as those used for autoclavable bottles for growth media, is treated by corona discharge treatment by an electrode having approximately 0.3 to 0.7 milliamps at a distance of approximately 2.5 cm from the electrode for approximately ¾ of a second. The interior surface of the cap top is then wetted with a 1% solution of N-(2-aminoethyl)-3-aminopropyltrimethoxysilane in isopropanol and allowed to dry. Sections of the silicone rubber/Teflon laminate may be cut in order to form a septum sized to tightly fit within the interior of the cap. The septum is then treated on the silicone rubber surface by corona discharge treatment employing a corona electrode, having 0.3 to 0.4 milliamps of current, 2.5 cm from the surface for approximately ¾ second. The treated septum is then immediately inserted into the cap and approximately 3.5 kg/cm² (about 50 psi) is applied to the septum from its opposite face (the side having the Teflon layer) and heated to about 120° C. The pressure is removed and the cap is allowed to cool to room temperature whereupon the silicone rubber septum is bonded directly to the top of the phenolic plastic cap, which fully occludes the aperture of the cap and creates a durable liquid tight seal.

While the present invention has been particularly shown and described with reference to preferred embodiments thereof, it will be understood to those skilled in the art that various changes in form and details may be made therein without departing from the spirit and the scope of the invention.

What is claimed is:

1. A sealing element comprising:
    a cap having a top with an opening therein; and
    a septum formed separately from said cap and comprising an elastomer, the elastomer having an ionized bonding surface directly bonded to an ionized interior surface of said cap thereby occluding the opening in said top and wherein there is no layer of adhesive or plastic material between said bonding surface and said interior surface.

2. The sealing element of claim 1 wherein said ionized interior surface comprises plastic and is ionized by exposure to a corona discharge for less than a second.

3. The sealing element of claim 2 wherein said ionized interior surface is ionized by exposure to a corona discharge from an electrode operated at about 0.3 to 0.7 milliamps of current and located at about 2.5 cm or less from the interior surface during said exposure.

4. The sealing element of claim 1 wherein said ionized interior surface is wetted with a primer prior to being bonded.

5. The sealing element of claim 4 wherein said primer comprises one of a silane coupling agent and a reactive silane.

6. A sealing element comprising:
    a cap having a top with an opening therein; and
    a septum formed separately from said cap and comprising an elastomer, the elastomer having an ionized bonding surface directly bonded to an interior surface of said cap, said interior surface having been wetted with a primer, thereby occluding the opening in said top and wherein there is no layer of adhesive or plastic material between said bonding surface and said interior surface.

7. The sealing element of claim 6 wherein said primer comprises one of a silane coupling agent and a reactive silane.

8. A sealing element comprising:
    a cap having a top with an opening therein; and
    a septum formed separately from said cap and comprising an elastomer, the elastomer having an ionized bonding surface ionized in ambient atmosphere directly bonded to an interior surface of said cap thereby occluding the opening in said top and wherein there is no layer of adhesive or plastic material between said bonding surface and said interior surface.

9. The sealing element of claim 8 wherein said elastomer comprises a previously cured thermoset elastomer.

10. The sealing element of claim 9 wherein said elastomer comprises rubber.

11. The sealing element of claim 10 wherein the elastomer comprises silicone rubber.

12. The sealing element of claim 8 wherein said septum further comprises a layer of polytetrafluoroethylene remote from the interior surface of said cap.

13. The sealing element of claim 8 wherein said cap comprises plastic.

14. The sealing element of claim 13 wherein said plastic comprises polyolefin.

15. The sealing element of claim 8 wherein the septum has a curved surface extending away from said top.

16. The sealing element of claim 8 wherein said cap comprises metal.

17. The sealing element of claim 16 wherein said metal comprises aluminum.

18. The sealing element of claim 16 wherein said cap comprises a crimp cap.

19. The sealing element of claim 8, wherein said ionized bonding surface ionized by exposure to a corona discharge electrode at 0.3 to 0.4 millilamps current for less than a second with the electrode about 6 mm to about 38 mm from said bonding surface.

20. A sealable container, comprising:
    a container,
    a cap for releasably attaching to said container wherein a liquid-tight seal is formed when the cap is attached to the container;
    said cap having a top with an opening therein; and
    a septum formed separately from said cap and comprising an elastomer, the elastomer having an ionized bonding surface ionized in ambient atmosphere directly bonded to an interior surface of said cap thereby occluding the opening in said top and wherein there is no layer of adhesive or plastic material between said bonding surface and said interior surface.

21. The sealable container of claim 20, wherein said ionized bonding surface is ionized by exposure to a corona discharge electrode at 0.3 to 0.4 milliamps current for less than a second with the electrode about 6 mm to about 38 mm from said bonding surface.

* * * * *

UNITED STATES PATENT AND TRADEMARK OFFICE
CERTIFICATE OF CORRECTION

PATENT NO.    : 6,234,335 B1
DATED         : May 22, 2001
INVENTOR(S)   : Gee et al.

It is certified that error appears in the above-identified patent and that said Letters Patent is hereby corrected as shown below:

<u>Column 3,</u>
Line 2, delete "flange".

<u>Column 6, claim 19,</u>
Line 37, delete "surface ionized" and replace with -- surface is ionized --.

<u>Column 6, claim 20,</u>
Line 42, delete "container," and replace with -- container; --.

Signed and Sealed this

Twenty-second Day of January, 2002

Attest:

JAMES E. ROGAN
Attesting Officer
Director of the United States Patent and Trademark Office